June 25, 1929.  A. G. F. KUROWSKI  1,718,694
TYPEWRITING MACHINE
Filed Oct. 21, 1925
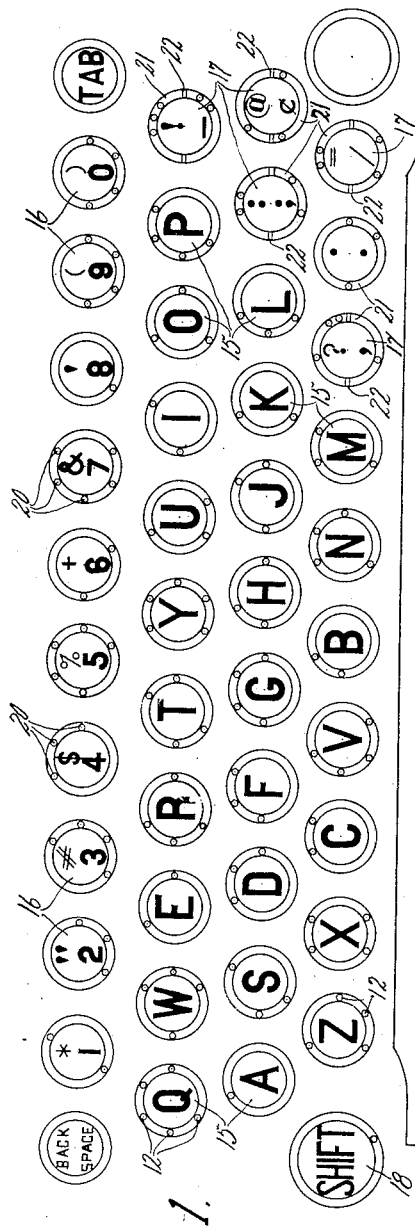
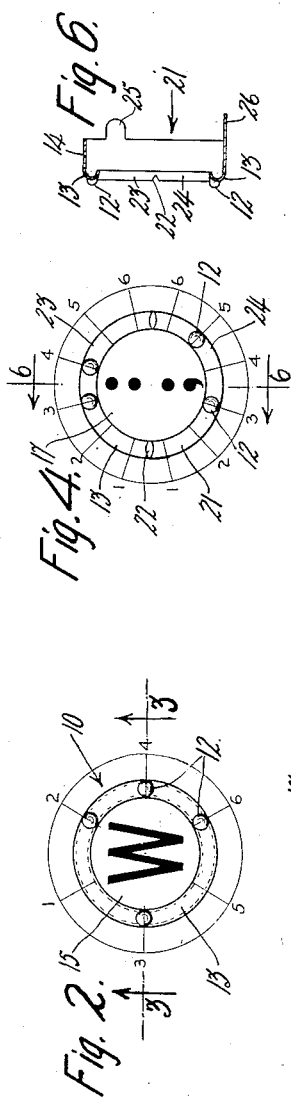
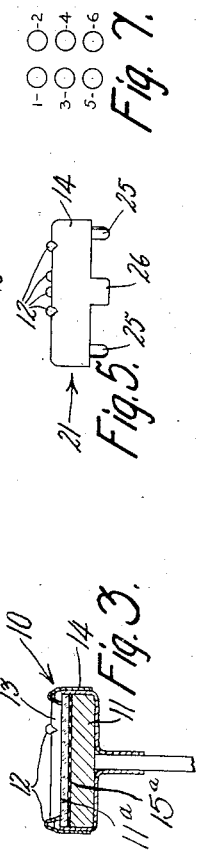
Inventor:
Alfred G. F. Kurowski
by B. C. Stickney
Attorney Patented June 25, 1929.

1,718,694

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Application filed October 21, 1925. Serial No. 63,862.

This invention relates to keyboards for typewriting machines, mainly for the use and education of the blind.

A feature of the invention is the provision of key-caps which may be applied to the standard keys of a typewriter-keyboard, having individual character-identifications in the form of raised points sensible to the touch of the operator's fingers. Blind people may readily recognize the different keys, and the invention may also be used to advantage in teaching students the touch system of typewriting.

The character-identifications are preferably formed as integral points on the surface of the key-cap, or otherwise secured to the cap, and the number, and the relative arrangement of the points is varied to produce different characters. Preferably the arrangement of the points is generally consonant with the Braille system of blind writing, and the component points of the various characters are preferably disposed adjacent the periphery of the keycap, conforming more specifically to a modification of the Braille system to provide for such arrangement.

Identification-characters so formed must necessarily have a definite position on the key, and therefore a feature of this invention is to provide key-caps which may be applied to the typewriter-keys in a definite relationship to the direction of the rows of keys. In the case of certain keys adapted for the printing of punctuation-marks and commercial signs usually employed in typewriting machines, the key-caps carry a pair of lower-case and upper-case character-identifications, which may be readily distinguished one from the other.

Other features and advantages will hereinafter appear,

In the accompanying drawings,

Figure 1 is a top plan view of a typewriter-keyboard, embodying the invention.

Figure 2 is a plan view, on an enlarged scale, of the key and its associated key-ring for the letter W.

Figure 3 is a vertical sectional view, on the line 3—3 of Figure 2.

Figure 4 is a view similar to Figure 2, showing one of the key-caps having two identification-characters.

Figure 5 is a front elevation of said keycap.

Figure 6 is a transverse sectional view, on the line 6—6 of Figure 4.

Figure 7 is a diagrammatic view of a standard Braille unit.

In carrying out the invention, I apply flanged key-caps or rings 10 to the keys 11 of a typewriting machine. Character-identifications 12 are provided upon the outer upper edges of the key-caps 10, and preferably include a series of raised round topped points which are sensible to the touch of the operator's fingers. The retaining flange 13 overlies the top of the key 11, the latter being covered with a glass-plate 11$^a$, as usual. A skirt-portion 14 of the key-cap 10, which embraces the sides of key 11, keeps the cap 10 in position on the key. The character-identifications 12 are preferably formed upon the flange 13 as by embossing, and the proportions of the parts are such that they lie uniformly outside of the field of contact of the operator's fingers, and within the proper outline of each key as a whole, but, at the same time, are so conveniently located as to be readily felt by the operator, if desired.

As is well known to those skilled in the art, the Braille system of blind writing includes symbols derived from a standard 6-point unit as clearly shown in Figure 7, the points being arranged in rectangular formation, two points in width and three points in height. By varying the number of points used and their relative arrangements, different symbols or characters are obtained. Thus the letter A is represented by one point which is designated as number 1 in Figure 7. Similarly, the letter B is represented by the points 1 and 3, and so on through the whole alphabet. It is to be noted that in the adaptation of the Braille system to the present invention, a modification is resorted to in that the component points of the various characters are equidistantly spaced upon the key-rings or retaining caps 10, so that the points 3 and 4, as shown in Figure 2, are not in vertical alignment with the points 1 and 5, and 2 and 6, respectively. However, the number of the points corresponds to the number used in the standard Braille alphabet, so that blind people, desirig to become skilled in typewriter operation, will have no difficulty in distinguishing the various keys. This convex arrangement provides a clear visual and contact field on each key-cap within said points.

In Figure 1, I have illustrated a standard keyboard as used on the Underwood typewriting machine, which includes a series of twenty-six alphabet-keys 15, a series of numeral keys 16, and a series of special symbol-keys 17, a shift key 18, and a space-bar 19. The flanged key-caps 10, which are fitted to the alphabet-keys 15 over the flat caps 15$^a$ thereof, are each provided with the necessary raised points to provide a Braille character corresponding to the letter typed by depression of that particular key, the component parts of said characters being disposed in a circle as previously set forth. Some keys may be oval, hexagonal, or their caps may have some other such geometric outline, and the points are preferably arranged to conform with the outline of such key-caps.

On the other hand, in the case of some typewriters the keys are not provided with any retaining flange or cap for a glass-plate 11$^a$, but simply have the flat top or cap 15$^a$ extending to the very edge of the cap. Manifestly the new arrangement of the Braille points disclosed herein may also be applied to such key-caps, the points being then fixed to the face of each cap in such manner as to surround an intermediate finger-space as before, which may also have a visible character thereon. The manner of securing the points upon such keys may readily suggest itself to any skilled mechanic, for the invention chiefly concerns the arrangement of the points so as to include an unobstructed and ample finger-space between the points upon the cap and also normal clearances between adjacent caps.

The numeral keys 16 each operate to print a numeral in the lower case position and a punctuation-mark or commercial symbol in the upper case, and, in view of the fact that numerals in the Braille system are designated by the same characters as the first ten letters of the alphabet, confusion would result if the key-caps for these keys were so identified. Therefore, special identification-characters 20 have been provided to represent the marks or signs associated with the various numerals, and the operator is expected to depend upon his memory for the association of the various numerals and signs with the certain symbols or characters 20. For example, if the operator desired to print the numeral 2, his memory association would tell him that the numeral 2 is on the same key as the quotation-marks.

In the case of the series of keys 17 which are usually disposed adjacent the right-hand end of the keyboard, a pair of punctuation-marks is combined on each key, and the arrangement of said marks is not always the same on all keyboards. Therefore, it is necessary that the operator be able to distinguish each mark by itself, and, therefore, when two characters are placed on a key-cap in accordance with the present invention, they must be readily distinguishable from one another. In order to accomplish this purpose, the flanges of the key-caps 21, which are fitted to the keys 17, are notched as at 22, the notches being preferably at diametrically opposite points on the key-caps. Thus, such a cap-flange is divided into two semi-circles 23 and 24, as shown in Figure 4, and the component points of the character-identifications are located on the flanges as designated by the numbers 1 to 6, in the same figure. For example, the colon is represented by two raised points in the positions 3 and 4 of the upper half-view of the key-cap 21, whereas the semicolon is represented by two raised points in the positions 3 and 5 on the lower half of the same key-cap.

Depending fingers 25 and 26 are preferably formed integral with the skirt-portion 14 of the key-cap for attaching the same to the key 11, the finger 26 being formed square as clearly shown in Figure 5, to distinguish it from the fingers 25, which may have rounded ends. In applying the characters 12 to the flanges of the key-caps, they are definitely related to the distinctively formed finger 26, and, when the key-cap 10 is applied to the key, finger 26 is aligned with the front of the key, whereby the character-identification carried by it will be applied in its proper position, relative to the front of the keyboard. Thus one of the fingers provides a positioning indicator to facilitate correct application of the key-caps. The invention may be used with keys having standard indicia, or, if desired, it may be used with blank keys, whereby a student will more readily learn to feel for the location of the key desired. In view of the fact that the raised points forming the various characters are circularly disposed outside of the normal field of contact of the operator's fingers, they will not interfere with the operation after the operator has become skilled in the use of the touch system.

Variations may be resorted to within the scope of the invention, and portions of the improvements may be used without others.

Having thus described my invention, I claim:

1. In a keyboard for a typewriting machine, the combination with a plurality of round keys, each key having a flat top, a cover-plate over said top and a fixed metallic annular member engaging said top and arranged for holding said cover-plate in place thereon and an inwardly-bent integral retaining flange disposed on said key above said plate, of indicia including integrally-formed rigid convex points formed on said flange and arranged to provide a normal contact and visual field on said plate, the indicia on the several keys differing from one another by the number and relative positioning of the points thereof, in accordance with a modification of the Braille system of characters for the blind.

2. In combination with a typewriter-key, a key-cap having a symmetrical outline including a fixed flange overlying a portion of the top of the key, said flange carrying rigid key-identification means sensible to the touch, including raised points on the periphery of the cap relatively arranged in accordance with the Braille system, there being depending means for engaging the key, and means for locating the flange with the key-identification means in proper position relative to the front of the key, whereby a blind person can readily reposition said key-cap upon the latter being accidentally turned on its key from proper registry therewith.

3. In combination with a typewriter-key, a key-cap including a fixed flange overlying a portion of the top of the key, said flange carrying a key-identification means sensible to the touch, including raised points on the periphery of the cap arranged in accordance with the Braille system, there being a plurality of fingers depending from the flange for attaching it to the key, and an auxiliary finger on said flange of distinctive form for definitely positioning the key-cap on the key, the position of the key-identification points being definitely related to the distinctively formed finger, whereby a blind person can reposition said key-cap upon the key when accidentally turned on its key from proper registry therewith.

4. A typewriter-keyboard for educating the blind, including alphabet and numeral keys provided with individual caps, each of said caps having one or more fixed raised points arranged thereon in such manner as to surround a normally-visible finger-space upon said cap, said points being arranged so as to provide said finger-space by being relatively disposed according to a modified Braille system in which the intermediate point on each side is displaced outwardly from vertical alignment with the upper and lower points of a normal six-point Braille character.

5. A typewriter-keyboard for educating the blind, including a plurality of keys having caps with individual outlines of symmetrical form, each of said caps having fixed convex Braille points so arranged upon the outer margin thereof as to provide a normally visible and clear intermediate contact field thereon, surrounded by said points which are relatively disposed according to a modified Braille system in which the several points in each vertical row of a normal six-point Braille character are convexly displaced from vertical alignment to conform with the outline of said cap.

6. A typewriter-keyboard for educating the blind, including groups of keys having caps with individual outlines of geometric form, each key of one of said groups having different characters in upper and lower case positions indicated by fixed raised points identical for both characters and arranged on the cap of said key in a marginal field generally conforming with the outline of the cap and surrounding a normally-visible and clear intermediate contact field thereon, and each key of another of said groups having corresponding characters in upper and lower case positions also indicated by fixed points arranged in a similar marginal field surrounding a normally-visible and clear intermediate contact field on the cap thereof, the points on all of said keys in said groups being arranged according to a modified Braille system in which the individual points in the vertical rows of a normal six-point Braille character are convexly displaced from vertical alignment.

7. A typewriter-keyboard for educating the blind, including groups of keys having caps with individual outlines of geometric form, each key of one of said groups having different characters in upper and lower positions indicated by fixed raised points arranged in a marginal field generally conforming with the outline of the cap thereof and surrounding a normally-visible and clear intermediate finger-space thereon, and transversely-aligned index means in said marginal field to sensibly subdivide said field into upper and lower halves and separate the points indicating the upper-case character from those indicating the lowercase character, and each key of another of said groups having corresponding characters in upper and lower case positions also indicated by fixed points arranged in a similar marginal field surrounding a normally clear intermediate finger-space on the cap thereof, the points on all of said keys in said groups being arranged according to a modified Braille system in which the individual points in the vertical rows of a normal six-point Braille character are convexly displaced from vertical alignment.

8. A typewriter-keyboard for educating the blind, including groups of keys having caps with individual outlines of geometric form, each key of one of said groups having different characters in upper and lower case positions indicated by fixed raised points arranged in a marginal field generally conforming with the outline of the cap thereof in order to provide a normally-visible and clear intermediate contact field thereon, each key of a second group having different characters in upper and lower case positions indicated by fixed raised points identical for both characters and arranged on the cap of said key in a similar marginal field conforming with the outline of the cap in order to provide a normally-visible and clear intermediate contact field thereon, and each key of a third group having corresponding characters in upper and lower case positions also indicated by fixed points arranged in a similar marginal field in order to similarly provide a normally clear intermediate contact field on the cap thereof, the points on each of said keys in all of said groups being arranged according to a modified Braille system in which the individual points of the vertical rows of a normal standard six-point Braille character are convexly displaced from vertical alignment, for the purpose of providing said intermediate clear contact field.

9. A typewriter-keyboard for educating the blind, including alphabet and numeral keys provided with caps having individual outlines of geometric form, there being means upon the periphery of each cap determining a marginal field conforming with said outline, and a plurality of fixed raised points arranged wholly in said marginal field so as to provide normal clearances between all adjacent caps and upon each cap a normally visible and unobstructed letter-field and finger-space on the face thereof intermediate said points.

10. A typewriter-keyboard for educating the blind, including a plurality of keys provided with caps thereon, there being a flange upon each cap providing a marginal field thereon, and a plurality of convex integral points arranged wholly in said marginal field upon said flange according to a modified Braille system in which the individual points in the vertical rows of a normal six-point Braille character are convexly displaced for vertical alignment while being transversely aligned in pairs, the outline of said cap and the inline of said marginal field providing normal clearances between all adjacent caps and upon each cap an intermediately disposed, normally-visible and unobstructed letter-field and finger-space upon the face thereof.

11. A typewriter-keyboard for educating the blind, including a plurality of keys having individual caps thereon, each of said caps having upon the same a Braille character including one or more fixed convex Braille points so arranged as to provide a normally visible and unobstructed, centrally-located letter-field and finger-space upon said cap disposed intermediate said points, so as to be enveloped by said Braille character.

ALFRED G. F. KUROWSKI.